United States Patent Office 3,141,118
Patented July 14, 1964

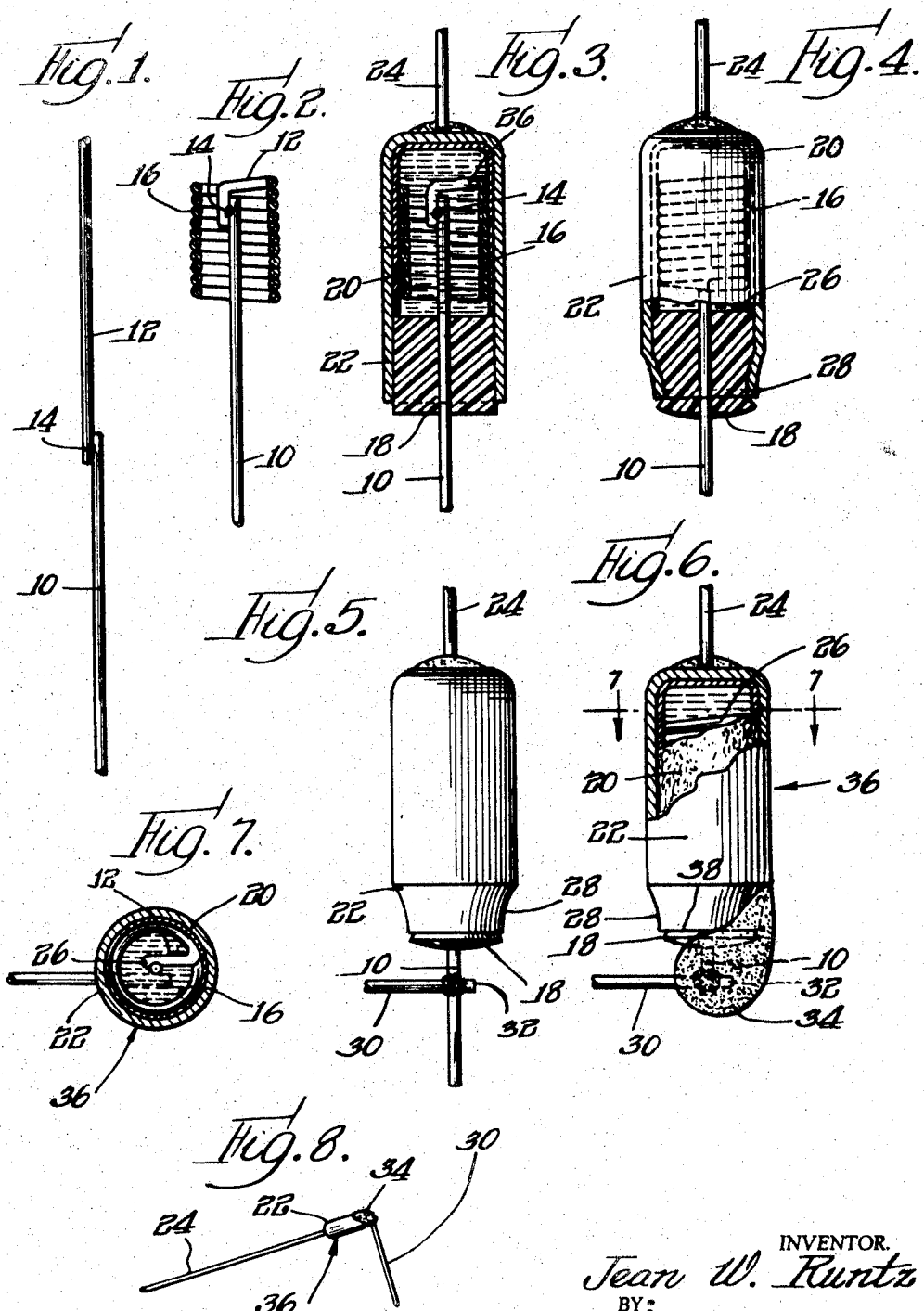

3,141,118
ELECTROLYTIC CAPACITOR UNIT
Jean W. Runtz, Morton Grove, Ill., assignor to David T. Siegel, Glencoe, Ill.
Filed Mar. 29, 1957, Ser. No. 649,415
12 Claims. (Cl. 317—230)

This invention relates to a tantalum wire capacitor unit utilizing a liquid electrolyte.

Capacitor units of the type indicated are conventional. However, in such conventional capacitor units the liquid electrolyte, which is corrosive to metals, tends to leak out of the capacitor unit, with consequent exposure to the corrosive electrolyte of metal parts usually mounted adjacently to the capacitor unit. Attempts have been made to provide leak-proof capacitor units of the type indicated, but as far as applicant is aware, no one has heretofore succeeded in making such a leak-proof capacitor unit without sacrificing some of the desirable electrical properties of the capacitor units.

It is therefore an object of this invention to provide a completely and effectively sealed tantalum wire capacitor unit utilizing a liquid electrolyte and characterized by all the desirable electrical properties of such capacitor units.

Other and further objects and features of the present invention will become apparent from the following description and appended claims as illustrated by the accompanying drawings which show, by way of an example, a capacitor unit according to the present invention and in which:

FIG. 1 is a fragmentary side elevation of a tantalum wire structure which is a starting material in fabricating a capacitor unit according to the present invention;

FIGS. 2–4 are central longitudinal cross sectional views, with parts shown in elevation, showing successive stages in the fabrication of a capacitor unit according to the present invention;

FIG. 5 is an elevational view of a capacitor unit in a further stage of fabrication;

FIG. 6 is a side elevation, with parts broken away, of a finished capacitor unit according to the present invention;

FIG. 7 is a cross sectional view taken along the line 7—7 of FIG. 6; and

FIG. 8 is a perspective view, on a reduced scale, of the finished capacitor unit of FIGS. 6 and 7.

The capacitor units of the present invention are fabricated by a method described as follows, reference being made to the drawings. First, for making an anode structure, a length of smooth or unetched tantalum wire 10 and a length of etched and thereby pitted or roughened tantalum wire 12 are provided. Smooth tantalum wire is available in commerce. Any suitable conventional method may be used for etching the smooth wire. Next, these two lengths of wire are welded together end to end, as indicated at 14 (see FIG. 1), by any suitable conventional welding method. Then the wire 12, with the exception of a short portion adjacent the weld 14, is formed into a tight helical coil 16, the remaining straight portion of the wire 12 and the wire 10 extending centrally and axially with respect to the coil 16 for a considerable distance beyond the free end of the coil 16, as illustrated in FIG. 2.

The assembly consisting of the straight wire 10 and the coil 16 is next subjected to anodic oxidizing treatment by any suitable conventional method to form or deposit thereon a layer (preferably, for highest capacity, a thin layer) of tantalum oxide which functions as a dielectric medium in the capacitor unit.

The anode coil structure fabricated as disclosed next has a bushing or plug 18 made of Teflon (polymerized tetrafluoroethylene) or other suitable inert insulating material threaded over the wire 10. If desired, the wire 10 may simply be pushed or drilled axially through the middle of this bushing or plug 18. The coil 16 is then wrapped in one or several layers of thin paper 20. Thereafter, the coil structure is inserted within a tubular silver cathode 22 closed at one end and having a lead wire 24 (which is suitably a nickel wire) connected to its closed end by any suitable conventional method. The plug or bushing 18 is of a size and shape to fit the open end of the cathode tube 22 closely but not necessarily tightly. The tube 22 is filled under vacuum with a suitable liquid electrolyte 26 such as an aqueous lithium chloride solution. The plug or bushing 18 is then pushed down into the tube 22 to close the open end thereof, the wire 10 projecting outside of the plug or bushing 18, as illustrated in FIG. 3. The end of the tube 22 is then spun down into the bushing or plug 18, as indicated at 28 and illustrated in FIG. 4.

In a succeeding step, an end portion of the wire 10 is cut off and a nickel wire 30 is welded (by any suitable conventional method) to the wire 10 a short distance from the plug or bushing 18. Note that, as shown in FIG. 5, the wires 10 and 30 are crossed where welded together, the weld being indicated at 32, with the end of the wire 30 just past the wire 10. The capacitor unit may next be submitted to aging for a suitable period of time. Any imperfect seals can easily be detected after the aging period. "Weeping" or leaking of electrolyte would then be easily noticeable. Finally, a cap or seal 34 of a suitable synthetic resin (such as an epoxy resin) is applied to the end of the capacitor, which latter (in its finished form) is indicated generally in FIGS. 6–8 at 36, so as to cover completely the projecting end of the wire 10, the weld 32, the free end of the lead wire 30 as well as a short portion of the wire 30 on the other side of the weld 32. The cap or seal 34 covers most, but not all, of the joint between the bushing 18 and the rim or lip of the open end of the cathode tube 22, part of this rim and the adjacent portion of the bushing 18 being exposed, as indicated at 38. This cap or seal 34 may or may not adhere to the cathode tube 22 and to the bushing 18, depending on the specific materials of construction which are used.

The general functions of the cathode tube 22, the tantalum oxide coated anode coil 16, the electrolyte 26, the lead wires 24, 30 and 10, 12 (that portion adjacent the weld 32) have been indicated hereinabove and will readily be understood by those skilled in the art. The paper wrapping 20 serves to prevent possible short circuits.

The spinning of the edge 28 of the tubular cathode 22 serves to restrict and elongate the plug or bushing 18 and thereby insures a tight seal as between the edge 28 of the cathode 22 and the bushing 18.

I have found that capacitors made with etched tantalum wire have far greater voltage rating and/or capacity than those made with smooth or unetched tantalum wire. However, if the capacitor unit of the present invention is made entirely with etched tantalum wire (instead of as disclosed hereinabove), then, as I have found, there is a decided tendency for the electrolyte to leak out through the bushing 18 along the etched tantalum wire. In other words, the seal between the compressed bushing 18 and an etched tantalum wire is not tight. But when a smooth or unetched tantalum wire 10 is used as disclosed hereinabove, a tight seal is obtained as between the wire 10 and the bushing 18. Thus the capacitor of the present invention is characterized by high electrical voltage rating and/or capacity and by freedom from any tendency to leakage of the corrosive electrolyte.

Many details may be varied without departing from the principles of this invention and it is therefore not my intention to limit the patent granted on this invention otherwise than necessitated by the scope of the appended claims.

The invention is claimed as follows:

1. A capacitor unit comprising a tubular metallic cathode having an open end and a closed end, a tantalum wire including a smooth portion and a coil-shaped rough portion coated with tantalum oxide and defining an anode extending within said cathode, said smooth wire portion projecting through said open end of said cathode, a closure member seated in said open end of said cathode spaced-apart from said rough portion and tightly embracing said smooth tantalum wire projecting through said open end, the lip of the open end of said cathode being constricted to compress said closure member, and a liquid electrolyte within said tubular cathode.

2. A capacitor unit as claimed in claim 1, wherein there is provided a resinous sealing member extending only partially along the joint between the lip of the open end of said cathode and said closure member.

3. A capacitor unit as claimed in claim 1, and further comprising a lead wire attached to said smooth tantalum wire portion a short distance outside said closure member and a resinous cap on the end of said closure member enclosing said smooth tantalum wire portion projecting outside said closure member and the end of said lead wire.

4. A capacitor unit as claimed in claim 3, wherein said resinous cap covers a part only of the joint formed between said closure member and the lip of said tubular cathode.

5. A method of making a capacitor unit which comprises providing a length of smooth tantalum wire and a length of rough tantalum wire, integrally uniting said wires end to end, thereafter forming said rough wire into coiled-shaped, oxidizing said wires to coat the same with tantalum oxide, threading said smooth wire portion through a closure member, spacing said closure member from said rough wire, inserting said coiled wire into a tubular cathode having a closed end and an open end, filling said cathode with a liquid electrolyte, inserting said closure member into the open end of said tubular cathode, and constricting the lip of said cathode to compress the closure member around the smooth wire threaded therethrough.

6. A method as claimed in claim 5, and further comprising the steps of attaching a lead wire to the end of said smooth tantalum wire projecting from said closure member, and embedding the end of said lead wire as well as said projecting smooth tantalum wire in a resinous cap attached to the end of said closure member.

7. A method as claimed in claim 5, and further comprising the step of sealing a part only of the joint formed between the lip of said cathode and said closure member with resin.

8. A capacitor unit comprising a tubular metallic cathode having an open end and a closed end, a tantalum wire including a smooth portion and a coil-shaped rough portion coated with tantalum oxide and defining an anode extended within said cathode, said smooth wire portion projecting through said open end of said cathode, a liquid electrolyte within said tubular cathode, and sealing means for the unit consisting of a closure member seated in said open end of said cathode spaced-apart from said rough portion and tightly embracing said smooth tantalum wire projecting through said open end.

9. A capacitor unit as claimed in claim 8, wherein said smooth and rough tantalum wire portions are joined together by a weld.

10. A method of making a capacitor unit which comprises providing a length of smooth tantalum wire and a length of rough tantalum wire, integrally uniting said wires end to end, thereafter forming said rough wire into coiled shaped, oxidizing said wires to coat the same with tantalum oxide, threading said smooth wire portion through a closure member, spacing the closure member from said rough wire, providing a tubular cathode having a closed end and an open end, filling said cathode with a liquid electrolyte, inserting said coiled wire into the tubular cathode, and the step of sealing the capacitor unit consisting of inserting the closure member into the open end of the tubular cathode with compression of the closure member on the smooth wire portion threaded therethrough.

11. A method of making an electrical unit which comprises providing a length of smooth tantalum wire and a length of rough tantalum wire, integrally uniting said wires end to end, thereafter forming said rough wire into coiled shaped, oxidizing said wires to coat the same with tantalum oxide, threading said smooth wire portion through a closure member, spacing the closure member from said rough wire, providing a tubular cathode having a closed end and an open end, filling said cathode with an electrolyte, inserting said coiled wire into the tubular cathode, and the step of sealing the capacitor unit consisting of inserting the closure member into the open end of the tubular cathode with compression of the closure member on the smooth wire portion threaded therethrough.

12. An electrical unit comprising a tubular metallic cathode having an open end and a closed end, a tantalum wire including a smooth portion and a coiled-shaped portion coated with tantalum oxide and defining an anode extending within said cathode, said smooth wire portion projecting through said open end of said cathode, an electrolyte within said tubular cathode, and means for sealing the unit consisting of a closure member seated in the open end of said cathode, spaced apart from said rough portion and tightly embracing said smooth tantalum wire projecting therethrough.

References Cited in the file of this patent

UNITED STATES PATENTS

| | | |
|---|---|---|
| 2,042,044 | Garstang | May 26, 1936 |
| 2,393,966 | Brennan | Feb. 5, 1946 |
| 2,846,624 | Hilton | Aug. 5, 1958 |
| 2,862,155 | Bubriski | Nov. 25, 1958 |
| 2,900,579 | Rogers | Aug. 18, 1959 |
| 2,907,933 | Nazzewski | Oct. 6, 1959 |

FOREIGN PATENTS

| | | |
|---|---|---|
| 424,186 | France | May 6, 1911 |
| 162,630 | Australia | Apr. 28, 1955 |